May 18, 1948.　　　　W. H. COBI　　　　2,441,754
PIPE COUPLING
Filed March 7, 1945
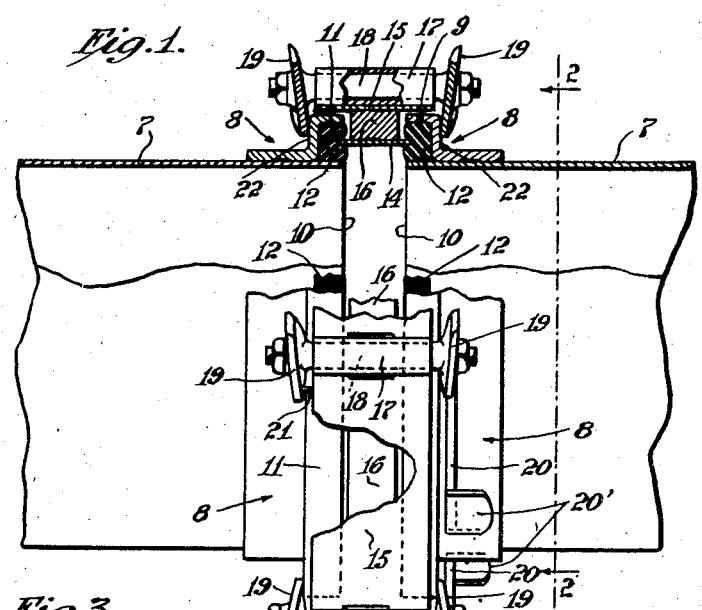
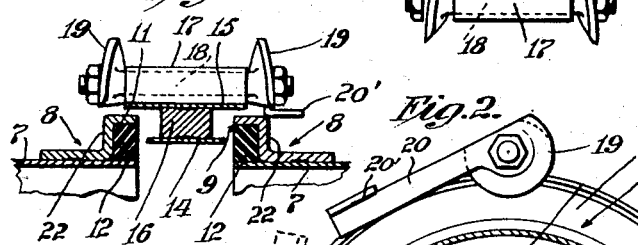
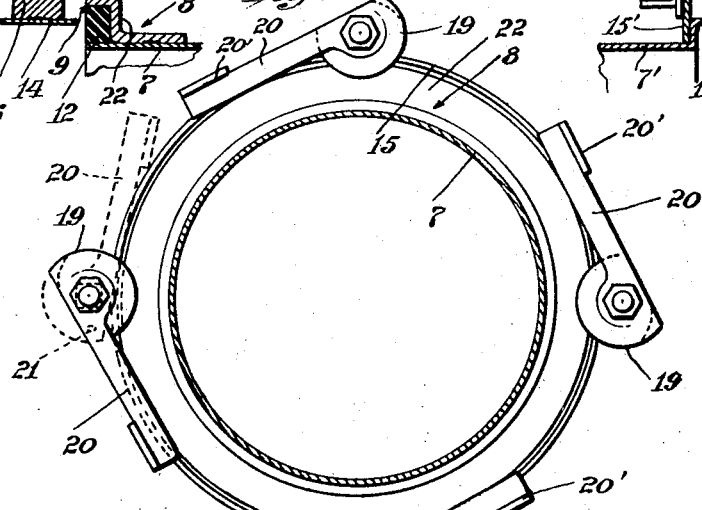
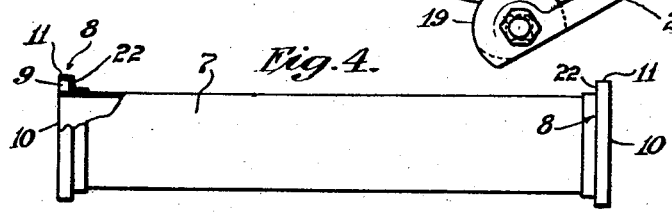
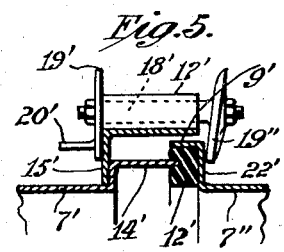
INVENTOR
*Walter H. Cobi*
BY
*[signature]*
ATTORNEY Patented May 18, 1948

2,441,754

UNITED STATES PATENT OFFICE 2,441,754

PIPE COUPLING

Walter H. Cobi, New York, N. Y.

Application March 7, 1945, Serial No. 581,419

12 Claims. (Cl. 285—129)

My invention relates particularly to systems or ducts used for the transmission of water or other liquids.

The main object is to provide effective pipe sections and coupling devices for building up a distribution system which can be easily and quickly erected.

Another object is to eliminate the use of bolts.

For this purpose each pipe section should be of light weight and is reinforced on its ends by collars containing resilient packing rings. These collars constitute flanges extending radially outward from the body of the section. Between the adjacent ends of successive sections is inserted an annular member which carries a number of clamping cams for engaging the flanges and drawing the ends toward each other and sealing the joint.

Fig. 1 is a longitudinal section and side elevation showing the connected ends of successive pipe sections.

Fig. 2 is a transverse section on the line 2—2 of Fig. 1 of a pipe and showing one of the coupling devices.

Fig. 3 is a fragmentary and longitudinal section showing the relative position of the coupling device inserted between two ends before drawing them toward each other.

Fig. 4 is a side view on a small scale of a pipe section, parts being shown in section.

Fig. 5 is a longitudinal sectional view showing modifications of the tube or pipe sections and a clamping device attached to one of the pipe sections.

Each pipe section 7 will ordinarily be formed of relatively light weight steel and a collar 8 is welded on each end. This collar is substantially Z-shaped in cross-section and is secured to the pipe a short distance from the end so as to leave a channel 9 between the extreme end 10 of the pipe and the rim 11 of the collar. In this channel is secured a ring 12 of rubber or other suitable resilient material.

The coupling device has a metal inner ring 14 adapted to be interposed between the resilient rings 12, 12. An outer guiding member 15, which may be a continuous ring, is secured to the ring 14 by an intermediate member 16 here shown as an annular member but which may be segments merely. The coupling device has a number of clamping devices, two or more. Each clamping device consists of a sleeve 17 secured to the member 16 or to the outer guiding member and disposed transversely of the outer and inner rings, and a shaft 18 rotatable in a bearing in the sleeve and carrying a helical cam 19 on each end. The cams are segmental in shape being less than 360° in order to provide clearance in assembling and disassembling. The clamping device has a handle 20, with a finger piece 20', secured to the shaft or to one end of the cams so as to facilitate rotation of the cams. A stop 21 limits the release movement in the proper position so that the cut-away portions of the cams will clear the flanges of the pipes.

By rotating a pair of cams from the position of Fig. 3, the cams 19, 19 engage the opposite walls 22 and draw the pipe sections toward each other. The rubber rings 12, 12 yield to the edges of the metal ring 14 and thus provide a liquid tight joint. A number of cam devices is required to draw the sections together uniformly. The arrangement however is such that the joint will be made tight even if the pipe sections are not in perfect alignment.

Such an arrangement makes it possible to erect a distribution system quickly and to easily disassemble and reassemble the parts.

In the form shown in Fig. 5, the pipe 7' on the left has an expanded or bell-shaped end 14', the end of which corresponds with the ring 14 of Fig. 1 for seating in the resilient packing ring 12'. The other pipe end 9' on the right of Fig. 5 is an integral bell-shaped part of the right hand pipe 7''. The ring 12' is suitably secured in the annular recess formed by this expanded end. The wall 22' forms the flange corresponding to the right hand flange 22 of Fig. 1. The sleeve 17' is carried by a flange or bracket 15' secured to pipe 7'. The shaft 18' is rotatably mounted in the sleeve and carries an abutment 19' on one end for engaging the flange 15' and a helical cam 19'' on the other end for engaging the flange 22' when the handle 20' is moved in the proper direction to draw the pipe sections toward each other and seat the flange ring 14' in the packing ring 12' and seal the joint. It will be understood that two or more of such clamping devices would be required for each joint. Such a form in some ways is simpler than that of Figs. 1 and 3. In fact both ends of the pipe could be formed as that at the right hand of Fig. 5 and used with the clamps of Figs. 1 and 3, and the shaft 18' might have cams like 19'' at its opposite end.

I claim:

1. In a liquid distribution system, pipe sections having collars secured to the ends and a number of coupling devices connecting adjacent sections, each coupling device having a shaft parallel with the axes of said shaft sections and a number of pairs of rotatably connected cams on each shaft, the cams of each pair engaging the collars on adjacent sections for drawing the same toward each other.

2. A pipe joint comprising the ends of adjacent pipe sections, collars mounted on the opposed ends so as to leave channels around the respective ends, resilient rings in said channels, a coupling device connecting the pipe ends, said device comprising a metal ring having its edges embedded in the resilient rings and a number of pairs of opposed cams carried by said metal ring and rotatable to engage the opposed collars.

3. A liquid transmission pipe section comprising a sheet metal tubular body having a collar of Z-shaped cross section secured to the body at a short distance from each end but leaving a channel containing a resilient packing exposed at the end for receiving a coupling device.

4. A pipe coupling device comprising two concentric annular members, the inner member being adapted to be inserted between the ends of adjacent pipe sections, the outer member being wider than the inner member and adapted to overlap the flanges of the ends of adjacent pipe sections.

5. A pipe coupling comprising an annular member adapted to be interposed between resilient rings held in the ends of the pipe sections to be joined and a number of clamping devices rotatably carried by said members, each clamping device including a shaft with a segmental helical cam mounted on each end.

6. A pipe coupling comprising pipe sections having flanges and grooves at the ends and resilient rings in the grooves, a metallic ring mounted between said resilient rings, a number of shafts rotatably carried by said metallic ring, and a helical cam on each end of each shaft for engaging said flanges and drawing them toward each other.

7. A pipe coupling comprising pipe sections having flanges and grooves at the ends and resilient rings in the grooves, a metallic ring mounted between said resilient rings, a number of shafts rotatably carried by said metallic ring, a helical cam on each end of each shaft for engaging said flanges and drawing them toward each other and a stop member on each shaft for limiting the releasing movement of said shaft.

8. In a liquid distribution system, pipe sections having annular radial flanged portions and resilient rings at their ends and coupling devices connecting adjacent sections, each coupling device having a number of pairs of rotatably connected cams and a metal annular member between said resilient annular members, the cams of each pair engaging the annular flanged portions on adjacent sections for drawing the sections toward each other to embed the edges of said metal annular member in said resilient annular members for forming a liquid tight joint.

9. A pipe coupling construction comprising pipe sections having between their adjacent ends a packing ring and including a metallic ring to be seated in the packing ring to seal the joint between the pipe sections, a shoulder on each pipe end and a number of clamping devices supported around the joint, each clamping device comprising a bearing sleeve, a shaft rotatably mounted in each sleeve, means on each end of each shaft for serving as an abutment to engage a shoulder on a pipe section, at least one abutment on each shaft comprising a helical cam.

10. A pipe joint comprising pipe sections having bell-shaped ends, a resilient ring in the bell-shaped end of one of said sections, a number of shafts rotatably carried by the other pipe section and a helical cam on at least one end of each of said shafts for engaging a portion of one of said bell-shaped ends for drawing said ends toward each other.

11. A pipe joint comprising pipe sections having opposed concentrically arranged bell-shaped ends, the bell-shaped end of one of said sections being smaller in diameter than the other end, a resilient ring in the bell-shaped end having the larger diameter, a number of shafts rotatably carried by the bell-shaped end with the smaller diameter and a helical cam on one end of each of said shafts for engaging a portion of the bell-shaped end with the larger diameter for drawing the bell-shaped ends toward each other to embed the edge of the bell-shaped end with the smaller diameter into said resilient ring for forming a liquid tight joint.

12. A pipe joint comprising pipe sections having bell-shaped ends, the bell-shaped end of one of said sections being smaller in diameter than the other end, a resilient ring in the bell-shaped end having the larger diameter, a number of shafts rotatably carried by the bell-shaped end with the smaller diameter, an abutment member on one end of each of said shafts for engaging a portion of the bell-shaped end with the smaller diameter and a helical cam on the other end of each of said shafts for engaging a portion of the bell-shaped end with the larger diameter for drawing said bell-shaped ends toward each other to embed the edge of the bell-shaped end with the smaller diameter into said resilient ring for forming a liquid tight joint.

WALTER H. COBI.

REFERENCES CITED

The following references are of record in the file of this patent:

UNITED STATES PATENTS

| Number | Name | Date |
|---|---|---|
| 2,300,743 | Hauf | Nov. 3, 1942 |

FOREIGN PATENTS

| Number | Country | Date |
|---|---|---|
| 632,899 | Germany | June 22, 1933 |
| 643,150 | Germany | Mar. 11, 1937 |